(12) United States Patent
Dahl

(10) Patent No.: US 12,298,122 B2
(45) Date of Patent: May 13, 2025

(54) DEVICE AND METHOD FOR MEASURING A SEMIFINISHED PRISM

(71) Applicant: MÖLLER-WEDEL OPTICAL GMBH, Wedel (DE)

(72) Inventor: Michael Dahl, Radbruch (DE)

(73) Assignee: Möller-Wedel Optical GmbH, Wedel (DE)

( * ) Notice: Subject to any disclaimer, the term of this patent is extended or adjusted under 35 U.S.C. 154(b) by 531 days.

(21) Appl. No.: 17/625,510

(22) PCT Filed: Jun. 29, 2020

(86) PCT No.: PCT/EP2020/068191
§ 371 (c)(1),
(2) Date: Jan. 7, 2022

(87) PCT Pub. No.: WO2021/004820
PCT Pub. Date: Jan. 14, 2021

(65) Prior Publication Data
US 2022/0276044 A1     Sep. 1, 2022

(30) Foreign Application Priority Data

Jul. 11, 2019   (DE) .................... 102019118825.3

(51) Int. Cl.
*G01B 11/26* (2006.01)
*G01B 9/10* (2006.01)
*G01M 11/02* (2006.01)

(52) U.S. Cl.
CPC ......... *G01B 11/26* (2013.01); *G01M 11/0264* (2013.01); *G01B 9/10* (2013.01)

(58) Field of Classification Search
CPC .......... G01B 9/06; G01B 9/10; G01B 11/002; G01B 11/26; G01B 11/27; G01B 11/272;
(Continued)

(56) References Cited

U.S. PATENT DOCUMENTS

| 1,253,796 A | * | 1/1918 | Douglass | G03B 33/00 359/638 |
| 3,224,099 A | * | 12/1965 | Brault | G01B 11/26 33/281 |
| 5,144,479 A | * | 9/1992 | Aharon | G01B 11/26 356/153 |

FOREIGN PATENT DOCUMENTS

| CN | 2204999 Y | 8/1995 |
| CN | 201903342 U * | 7/2011 |

(Continued)

OTHER PUBLICATIONS

S. Madhusudana Rao, "Method for Measurement of the Angles of an Equilateral [60-DEG] PRISM", Optical Engineering, Soc. of Photo-Optical Instrumentation Engineers, vol. 36, No. 5, May 1, 1997 [May 1, 1997], XP000692386, 2 pgs.

(Continued)

*Primary Examiner* — Gordon J Stock, Jr.
(74) *Attorney, Agent, or Firm* — Alix, Yale & Ristas, LLP

(57) ABSTRACT

A method for measuring a semifinished prism in which a first test beam path is produced, by which a first test image is imaged to infinity, and in which the first test beam path is guided as an incident beam path onto a first non-polished surface of the prism. A beam path reflected from the first non-polished surface is captured by a telescope, wherein the first test image is imaged onto a detector in the telescope. The incident beam path forms an obtuse angle with the reflected beam path. A second test beam path reflected from a second surface of the prism is captured by a telescope, wherein a second test image, which is imaged to infinity by the second test beam path, is imaged onto a detector by the telescope. The angle between the first surface and the second surface is determined on the basis of the difference between an orientation of the first surface, derived from the first test (Continued)

image, and an orientation of the second surface, derived from the second test image. The invention also relates to an associated measuring device.

9 Claims, 2 Drawing Sheets

(58) Field of Classification Search
CPC ... G01N 2021/8477; G01N 2021/9511; G01N 33/381; G01N 33/385; G01N 33/386; G01N 27/87; G01N 27/95; G01N 27/9518; G01N 27/958; G01M 11/00; G01M 11/005; G01M 11/0242; G01M 11/025; G01M 11/0278; G01M 11/0257; G01M 11/0264; G01C 2009/066; G01C 9/00; G01C 9/02; G01C 9/04; G01C 9/06
See application file for complete search history.

(56) References Cited

FOREIGN PATENT DOCUMENTS

| CN | 102798357 A | * | 11/2012 | |
| CN | 105547657 A | * | 5/2016 | ............ G01M 11/02 |
| CN | 106123810 A | * | 11/2016 | |
| CN | 106128250 A | * | 11/2016 | |
| CN | 106157768 A | | 11/2016 | |
| CN | 106289112 A | * | 1/2017 | |
| CN | 106353072 A | * | 1/2017 | |
| CN | 206179366 U | * | 5/2017 | |
| CN | 106871822 A | * | 6/2017 | ............ G01B 11/26 |
| CN | 107833514 A | * | 3/2018 | |
| DE | 202012004886 U1 | | 7/2012 | |
| DE | 202013003898 U1 | | 7/2014 | |
| GB | 568936 A | * | 4/1945 | |
| JP | S60111212 A | | 6/1985 | |
| JP | 2008267942 A | * | 11/2008 | |

OTHER PUBLICATIONS

Krey Stefan et al., "Measuring the refractive index with precision goniometers: A comparative study", Proceedings of SPIE, IEEE, US, vol. 8992, Mar. 8, 2014 [Mar. 8, 2014], XP060036059, 10 pgs.
PCT International Search Report and Written Opinion for International application No. PCT/EP2020/068191 filed Jun. 29, 2020; Date of Mailing: Oct. 7, 2020; 14 pgs.
PCT International Preliminary Report on Patentability for International application No. PCT/EP2020/068191 filed Jun. 29, 2020; Date of Issuance: Jan. 11, 2022; 9 pgs.

* cited by examiner ated with an angular position and a second angular position of the turntable can be read.

DEVICE AND METHOD FOR MEASURING A SEMIFINISHED PRISM

BACKGROUND

The invention relates to a device and a method for measuring a semifinished prism.

In a finished prism, a plurality of faces are polished so that a light beam impinging on the face generates a specular reflection. The specular reflection of the light beam may be used to establish the orientation of a face with a goniometer. A light beam may be guided onto the polished face by the goniometer and the orientation of the face may be deduced from the direction of the reflected beam path. If the orientations of two faces of the prism are determined, the angle included between the faces may be deduced.

Particularly in the course of the production process of a prism, it may be beneficial to establish the orientation of faces of a semifinished prism. A semifinished prism comprises a surface which is finely ground but not yet polished. If the measurement reveals that the orientation of a finely ground face of the semifinished prism does not yet correspond to the design, it may be reprocessed without an already polished surface having to be spoiled.

SUMMARY OF THE INVENTION

The object of the invention is to present a method and a device with which the orientation of an unpolished surface of a prism can be established. On the basis of the prior art, the object is achieved by the features of the independent claims. Advantageous embodiments are specified in the dependent claims.

In the method according to the invention, a first test beam path, with which a first test image is imaged at infinity, is generated. The test beam path is guided as an incident beam path onto an unpolished first face of the prism. The beam path reflected by the unpolished first face is acquired by a telescope, the first test image being imaged in the telescope onto a detector, and the reflected beam path making an obtuse angle with the incident beam path. A second test beam path reflected by a second face of the prism is acquired by a telescope, a second test image, imaged at infinity with the second test beam path, being imaged by the telescope onto a detector. The angle between the first face and the second face of the prism is determined with the aid of the difference of an orientation of the first face, derived from the first test image, and an orientation of the second face, derived from the second test image.

The invention is based on the discovery that it is possible to generate a specular reflection by an unpolished surface of a prism by guiding the test beam path onto the face at a large angle of incidence. A large angle of incidence is equivalent to saying that the direction of the beam path makes a small angle with the surface. The large angle of incidence leads to a more favorable ratio between the wavelength of the light and the roughness of the face, which affects the light, so that with otherwise unchanged conditions the light is no longer scattered diffusely but is in part specularly reflected. This is widely known and has already been used in the prior art to check whether a rough face is planar. The reflected beam path has an angle of emergence which is equal to the angle of incidence. According to the invention, the angle included between the incident beam path and the reflected beam path is an obtuse angle. The obtuse angle corresponds to the sum of the angle of incidence and the angle of emergence.

The position at which the test image impinges on the detector of the telescope depends on the direction of the reflected beam path. By reciprocity, the orientation of the unpolished face may be deduced from the position of the test image on the detector.

If the orientation of a second face of the prism is determined with a second test beam path, the angle between the two faces of the prism may be deduced from the difference between the two measurements.

Obtuse denotes an angle which is more than 90°. The angle is preferably much more than 90°, for example more than 120°, preferably more than 140°, more preferably more than 150°. Formulated the other way round, the test beam path incident on the surface makes an angle with the surface which lies between 1° and 30°, preferably between 2° and 20°, more preferably between 5° and 15°.

The incident beam path and the reflected beam path form different sections of the test beam path. When referring to an angle which is included between two beam paths, this relates to the angle that the respective central rays make with one another.

In order to generate a specular reflection with the test beam path impinging obliquely on the surface, it is advantageous for the unpolished surface of the semifinished prism to have a low roughness. The last manufacturing step before polishing is generally fine grinding. The unpolished surface of the semifinished prism may be in a finely ground state. The roughness of the unpolished surface may, for example, lie between $Rq=10$ μm and $Rq=0.2$ μm (for example $Rq=0.3$ μm) in terms of mean roughness. Advantageously, the mean roughness lies between $Rq=4$ μm and $Rq=0.4$ μm.

There are various possibilities for determining the orientation of the second face of the prism. In one variant, the position of the prism in space may remain unchanged. A second test beam path coming from a different direction is then guided onto the second face. If the direction of the first test beam path and the direction of the second beam path are known, the angle included between the two faces may be deduced. The two test beam paths may be directed simultaneously onto the prism from different directions. It is also possible to guide a first test beam path onto the prism from a first direction in a first step and to guide a second test beam path onto the prism from a second direction in a subsequent second step. The invention is not restricted to a particular sequence during the measurement of the faces. The first face may be measured first and the second face may be measured subsequently, or vice versa.

In one advantageous embodiment, the direction of the test beam path in space remains unchanged and the position of the prism relative to the test beam path is changed between the measurement of the first face and the measurement of the second face.

In one variant, the movement of the prism in space is a rotational movement about an axis of rotation. If the axis of rotation is oriented approximately parallel to the first face and the second face of the prism, the angle included between the two faces may be deduced from the angle of rotation of the prism.

The prism may be arranged on a turntable, the prism resting with a third face on the upper side of the turntable. The first face of the prism and/or the second face of the prism may be oriented approximately perpendicularly to the third face. The turntable may be equipped with an angle meter, from which the angular difference between a first angular position and a second angular position of the turntable can be read.

The central ray of the reflected first test beam path (or its extension, which is included by the term central ray) may intersect the axis of rotation of the turntable, as is usual in the case of a conventional goniometer, particularly when the goniometer is configured as an autocollimator. This configuration has the advantage that a conventional measurement structure may be used and provided with an additional function by adding a collimator which generates the test beam path. In this variant, the prism should be oriented in such a way that the edge contained between the first face and the second face is essentially arranged close to the axis of rotation of the turntable. In particular, the distance between the axis of rotation and the edge may be less than the distance between the axis of rotation and the center of mass of the prism. If the angle included between two other faces of the same prism is intended to be determined, the position of the prism on the turntable must be changed.

In an alternative embodiment, the central ray of the reflected first test beam path lies at a distance from the axis of rotation of the turntable. The distance between the central ray of the beam path and the axis of rotation is preferably less than the greatest extent of the prism in a plane parallel to the turntable. It is then possible to measure a prism which rests approximately centrally on the turntable, so that the axis of rotation intersects the prism. In particular, the distance between the axis of rotation and the center of mass of the prism may be less than the distance between the axis of rotation and each of the edges of the prism. The distance between the central ray of the reflected first test beam path and the axis of rotation may be adjusted in such a way that more than two faces of the prism can be measured without the prism needing to be displaced relative to the axis of rotation.

In one embodiment, the central ray of the reflected first test beam path corresponds to the optical axis of the telescope. It is also possible for the central axis of the reflected first test beam path to be offset relative to the optical axis of the telescope. A deviating element, by which the beam path is laterally offset, may for example be arranged in the reflected beam path. In one embodiment, the deviating element corresponds to a prism, and in another embodiment the deviating element comprises two mirrors.

By removing the deviating element from the beam path, it is possible to switch between a first measurement mode and a second measurement mode. The first measurement mode, in which the test beam path is offset relative to the axis of rotation of the turntable, may be used for measurements according to the invention in which the test beam path impinges on the face to be measured with a large angle of incidence. The second measurement mode may correspond to a conventional goniometer measurement in which the test beam path impinges on the face to be measured with a small angle of incidence. The deviating element is preferably configured in such a way that the reflected test beam path extends parallel to the surface of the turntable in the first measurement mode and in the second measurement mode, the distance between the turntable and the central ray path of the beam path more preferably being the same in both cases.

In order to be able to measure unpolished faces in the first measurement mode and to be able to measure polished faces in the second measurement mode, the telescope may be part of an autocollimator. The autocollimator may comprise a light source. With a collimator, the light emitted by the light source can be shaped into a collimated beam path. A representation, which is imaged at infinity by the collimator, of the test image may be arranged at the focal point of the collimator. The beam path emitted by the collimator may be guided as a test beam path onto the polished face of the prism, the polished face of the prism being oriented in such a way that the beam path reflected by the polished face is sent back in the autocollimator and can be evaluated by the telescope.

For the measurement according to the invention of unpolished faces, it is advantageous for the test beam path to be generated by a collimator, the prism to be measured being arranged between the collimator and the telescope. If the prism is arranged between the collimator and the telescope, there is a plane perpendicular to the optical axis of the telescope such that the telescope is arranged on one side of the plane and the collimator is arranged on the other side of the plane. By the collimator, the light emitted by a light source may be shaped into a collimated beam path. A representation of the test image may be arranged at the focal point of the collimator, so that the test image is imaged at infinity within the collimated test beam path.

In one variant, the test beam path is generated by a laser. The light beam generated by the laser may be controlled and deviated in such a way that the beam path in the scope of the invention constitutes a first test image imaged at infinity. For example, the laser may be a cross-line laser.

It would also be conceivable to generate the test beam path on the telescope side, so that the test beam path is reflected for a first time on the unpolished face, is sent back by a mirror and is then reflected for a second time on the unpolished face. The test beam path sent back by the mirror then forms the incident test beam path in the scope of the invention. This, however, entails a reduced luminous intensity of the test image since a sizeable part of the light is lost in each case during the reflection on the unpolished face.

The second face of the prism may likewise be an unpolished face. The measurement of the second face may be carried out in the same way as the measurement of the first face. A second test beam path, with which a second test image is imaged at infinity, is thus generated. The second test beam path is guided as an incident beam path onto the unpolished second face so that the incident beam path makes an obtuse angle with the reflected beam path. The beam path reflected by the unpolished second face is acquired by the telescope.

In one variant, the second face of the prism is a polished face, the orientation of which may be determined conventionally.

The detector of the telescope may be an image sensor with which the test image is acquired. The acquired test image may be represented on a display. It would also be conceivable to arrange a screen or a transparent film at the focal point of the telescope, so that the test image is directly visible.

The test image may be represented together with a test image reproduction, the test image reproduction corresponding to a target position. A target position means that the test image coincides exactly with the test image reproduction when the orientation of the measured face of the prism corresponds to a target specification. If the orientation of the measured face does not correspond to the target value, the test image will be displaced relative to the test image reproduction. From the position of the test image relative to the test image reproduction, it is possible to read the direction in which the measured face deviates from the target value. It is also possible to configure the test image reproduction in such a way that it represents a tolerance range around the target value.

The test image may, for example, be configured as a crosshair. From the displacement of two crosshairs relative to one another, the deviation in two directions may be read easily. Other configurations of the test image are also possible. It would, for example, be conceivable to use a simple point as the test image and to deduce the orientation of the measured face from the distance between the point and a midpoint of the detector.

The angle determined by the method between the first face and the second face may be compared with a target angle. If the deviation is more than a predetermined threshold value, the unpolished face may be reprocessed in order to bring the orientation of the face closer to the target value. Following the reprocessing, the method according to the invention may be carried out again in order to establish whether the angle between the first face and the second face now matches the target angle sufficiently.

The invention furthermore relates to a method for producing a prism. In the method, a first face of the prism is finely ground. The angle between the finely ground face and a second face may be determined by the method according to the invention. The second face may be finely ground or polished. If the deviation between the angle and a target angle is less than a predetermined threshold value, the first face of the prism may be polished. If the deviation between the angle and the target angle is more than the predetermined threshold value, the first face of the prism may be reprocessed.

The invention furthermore relates to a measuring device for measuring a semifinished prism. The measuring device comprises a light source for generating a test beam path with which a test image is imaged at infinity. The test beam path is guided as an incident beam path onto a face of a prism. A telescope is configured to acquire the beam path reflected by the face of the prism and to image the test image onto a detector. The incident beam path makes an obtuse angle with the reflected beam path. The measuring device may comprise a turntable by which the position of the prism to be measured can be changed relative to the test beam path.

The measuring device may comprise a turntable which is mounted rotatably about an axis of rotation. The turntable may be rotated by a predetermined angle of rotation between the measurement of a first face and the measurement of a second face of the prism. This may be done manually or under the control of a control unit. The measuring device may comprise an evaluation unit which evaluates the angle of rotation of the turntable, the position of a first test image on the detector and the position of a second test image on the detector in order to calculate the angle included between two faces of the prism.

The measuring device may be refined with further features which are described in connection with the method according to the invention. The method may be refined with further features which are described in connection with the measuring device according to the invention.

BRIEF DESCRIPTION OF THE DRAWINGS

The invention will be described by way of example below with reference to the appended drawings with the aid of advantageous embodiments. In detail.

DETAILED DESCRIPTION

Figure 1:
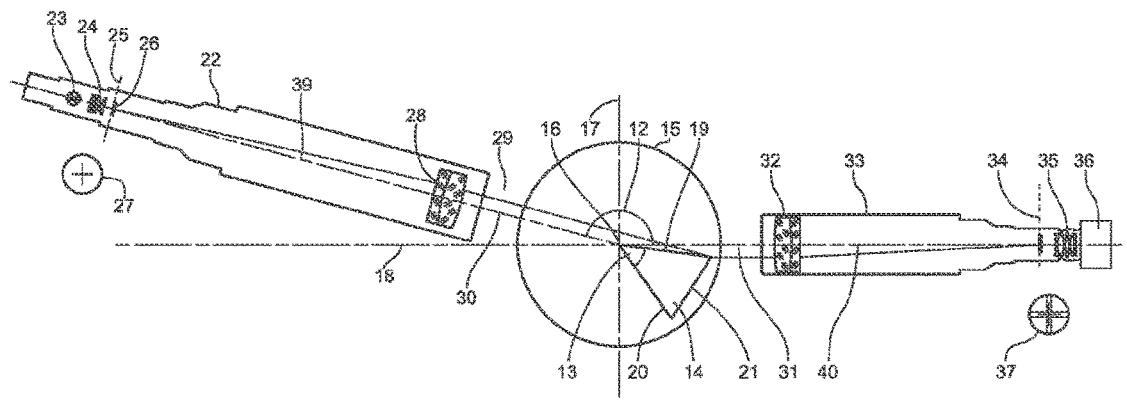
FIG. 1: shows a first embodiment of a measuring device according to the invention.

In a measuring device in FIG. 1, a prism 14 is arranged on a turntable 15. The turntable 15 is mounted rotatably about an axis of rotation 16, which is indicated in FIG. 1 as a point of intersection of a vertical axis 17 with a horizontal axis 18. The turntable 15 is equipped with an angle measuring instrument (not represented) by which an angle of rotation about the axis of rotation 16 can be recorded precisely.

The prism 14 has a bottom face, with which it rests on the turntable, and three side faces 19, 20, 21, which are respectively intended to make a right angle with the bottom face. The edge arranged between a first face 19 and a second face 20 of the prism 14 coincides approximately with the axis of rotation 16 of the turntable 15.

The prism 14 is a semifinished prism, in which the side faces 19, 20, 21 are finely ground but not yet polished. The fine grinding is the last processing step before the polishing. The surfaces then have a roughness of between $Rq=10$ μm and $Rq=0.2$ μm in terms of mean roughness. With this roughness, visible light that impinges at a small angle of incidence is diffusely scattered while light impinging at a large angle of incidence generates a specular reflection.

Figure 4:
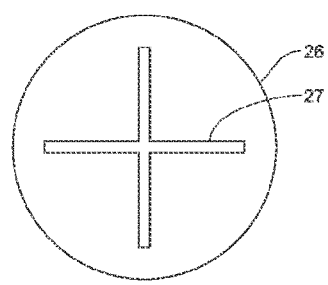
FIG. 4: shows a representation of a test image.

The measuring device comprises a collimator 22 and a telescope 33. The collimator 22 has a light source 23, the light of which illuminates via a lens arrangement 24 the test image 27 in the focal plane 25 of the objective 28. The test image 27 has according to FIG. 4 the shape of a crosshair 27.

The test image 27 is imaged at infinity by the objective 28. The beam path thereby collimated is guided as a first test beam path 29 onto the first face 19 of the prism. Since the first test beam path 29 makes a small angle of about 5° with the first face 19 of the prism, a specular reflection occurs so that the first test beam path 29, which before impinging on the first face 19 is referred to as an incident beam path 30, continues in a reflected beam path 31.

Figure 5:
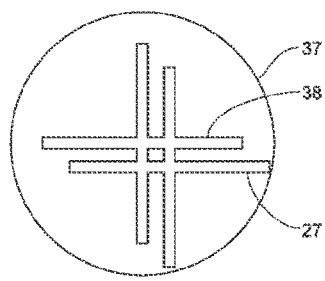
FIG. 5: shows a possible image on the detector of a measuring device according to the invention.

The reflected beam path 31 passes through the objective lens 32 of the telescope 33 and is focused in a plane 34. With a lens arrangement 35, the test image 27 is observed by eye or is imaged onto a detector 36 and represented on a display 37. The display 37 shows the actual position, acquired by the detector 36, of the test image 27 relative to a test image reproduction 38 in a target position. In the example according to FIG. 5, the actual position of the test image 27 is displaced to the right and downward relative to the target position. The orientation of the first face 19 may be deduced from the direction and the magnitude of the displacement.

After the measurement of the first face 19, the turntable 15 is rotated about the axis of rotation 16 until the collimated beam path emitted by the collimator 22 impinges as a second test beam path at the same angle of about 5° on the second face 20 of the prism 14. The orientation of the second face 20 may now be read with the aid of a second test image on the detector 37 in the same way.

With the aid of the position of the two test images on the detector 37 and while taking into account the angle 12 through which the turntable 15 was rotated between the measurements of the first face 19 and the second face 20, the angle 13 included between the first face 19 and the second face 20 may be determined.

The angle 13 may be compared with a target angle. If the deviation between the actual value and the target angle is more than predetermined threshold value, the first face 19 and/or the second face 20 may be processed again by fine grinding in order to correct the deviation. If the deviation is less than the predetermined threshold value, the finely ground faces 19, 20 may be polished in order to complete the semifinished prism 14.

In the embodiment according to FIG. 1, the optical axis 39 of the collimator 22 and the optical axis 40 of the telescope 33 are aligned with the axis of rotation 16 of the turntable 15. By rotation of the turntable 15, the test beam path 29 may be directed either onto the first face 19 or onto the second face 20, but not onto the third face 21. If a different angle of the prism 14 is intended to be measured, the prism 14 must be brought into a different position on the turntable 15.

Figure 2:
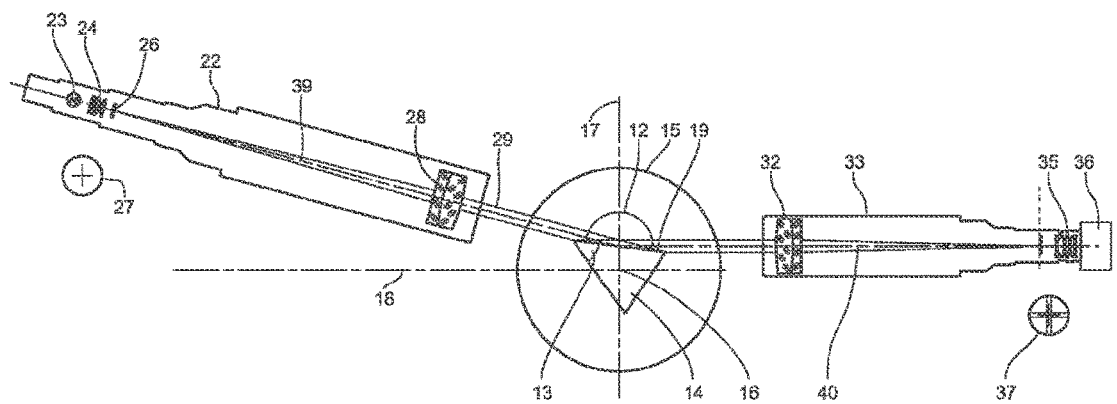
FIG. 2: shows a second embodiment of a measuring device according to the invention.

FIG. 2 shows an embodiment in which the optical axis 39 of the collimator 22 and the optical axis 40 of the telescope 33 are displaced parallel relative to a straight line which extends through the axis of rotation 16 of the turntable 15. The prism 14 rests approximately centrally on the turntable 15, so that the prism 14 is intersected by the axis of rotation 16. The offset of the optical axes 39, 40 relative to the axis of rotation 16 is dimensioned so that all side faces 19, 20, 21 of the prism 14 can be measured without changing the position of the prism 14 on the turntable 15.

Figure 3:
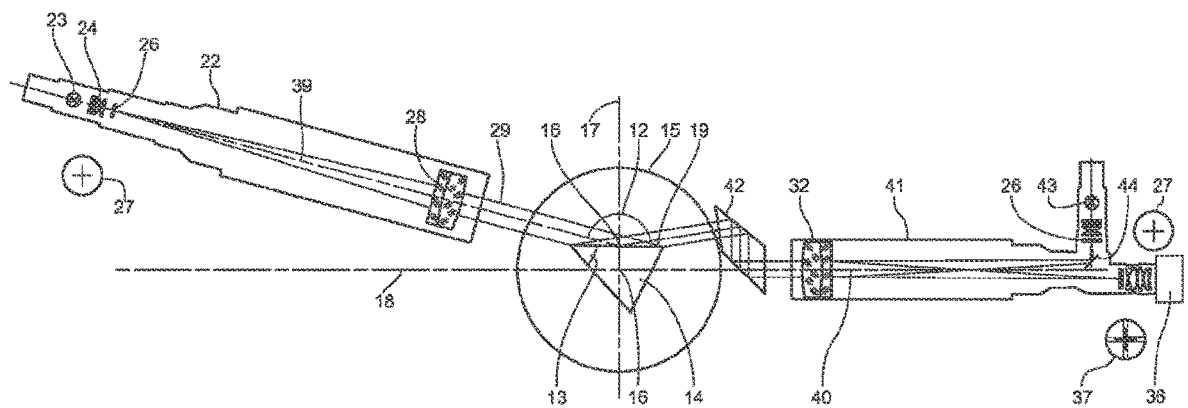
FIG. 3: shows a third embodiment of a measuring device according to the invention.

In the further embodiment according to FIG. 3, the telescope is part of an autocollimator 41. The autocollimator 41 comprises a light source 43, the light of which is guided by a beam splitter 44 in the direction of the objective 32 of the autocollimator 41. The light passes through an aperture 26, which represents a test image 27, arranged at the focal point of the objective 32. The light is shaped by the objective 32 into a collimated beam path in which the test image 27 is imaged at infinity.

If the light impinges as a test beam path on a reflective face which makes approximately a right angle with the optical axis of the autocollimator 41, the test beam path is reflected and passes back through the objective 32 into the autocollimator. The light is focused onto a detector 36, on which the position of the test image 27 may be seen. From the position of the test image 27 on the detector 36, it is possible to deduce whether the reflective face exactly makes a right angle with the optical axis of the autocollimator 41 or whether there is small deviation from this target value.

The measuring device comprises, arranged in front of the objective 32 of the autocollimator 41, an auxiliary prism 42 which in a first state is arranged in the beam path in front of the objective 32 of the autocollimator 41 and in a second state is removed from the beam path. The measuring device may, for example, comprise a swivel mechanism which makes it possible to change the auxiliary prism 42 between the two states.

When the auxiliary prism 42 is removed from the beam path, the measuring instrument may be used like a conventional goniometer. The test image 27 generated by the light source 43 impinges on a reflective face oriented perpendicularly to the optical axis 40 of the autocollimator 41, so that the test image 27 is reflected back into the autocollimator 41. In this way, it is possible to measure a prism whose surfaces are reflective (this is not represented).

When the auxiliary prism 42 is swiveled into the beam path, the beam path is offset parallel relative to the optical axis 40 of the autocollimator 41. The functionality then corresponds to the exemplary embodiment according to FIG. 2. The test image is generated by the collimator 22 and directed at a small angle onto an unpolished face 19 of the prism 14. The reflected test beam path 29 impinges on the auxiliary prism 42 and is guided through the objective 32 of the autocollimator 41.

The invention claimed is:

1. A method for measuring a semifinished prism, having the following steps:
   a) generating a first test beam path, with which a first test image is imaged at infinity;
   b) guiding the first test beam path as an incident beam path onto an unpolished first face of the prism;
   c) acquiring a beam path reflected by the unpolished first face with a telescope, the first test image being imaged in the telescope onto a detector, and the incident beam path making an obtuse angle with the reflected beam path;
   d) acquiring a second test beam path reflected by a second face of the prism with the telescope, a second test image, imaged at infinity with the second test beam path, being imaged by the telescope onto the detector;
   e) determining an angle between the first face and the second face with the aid of a difference of an orientation of the first face, derived from the first test image, and an orientation of the second face, derived from the second test image.

2. The method of claim 1, wherein the unpolished first face is in a finely ground state.

3. The method of claim 1, wherein the angle between the first face and the second face is compared with a target angle, and in that the first face and/or the second face is reprocessed if a deviation of the angle from the target angle is more than a predetermined threshold value.

4. The method of claim 1, wherein the prism is rotated about an axis of rotation between a measurement of the first face and a measurement of the second face.

5. The method of claim 4, wherein more than two faces of the prism are measured without the prism being displaced relative to the axis of rotation.

6. The method of claim 1, wherein a central axis of the reflected first test beam path is offset by a deviating element relative to an optical axis of the telescope.

7. The method of claim 6, wherein switching between a first measurement mode and a second measurement mode is carried out by arranging the deviating element in the first test beam path and removing the deviating element from the first test beam path.

8. The method of claim 1, wherein the first test beam path is generated by a collimator, and in that the prism is arranged between the collimator and the telescope.

9. The method of claim 7, wherein in the second measurement mode with the deviating element removed from the first test beam path the first test image acquired by the detector is represented together with a test image reproduction, the test image reproduction being arranged in a target position.

* * * * *